United States Patent [19]

Dworski

[11] Patent Number: 5,261,183
[45] Date of Patent: Nov. 16, 1993

[54] DUAL-POSITION FISH LURE

[76] Inventor: Michael Dworski, 1201 US Hwy. One, Ste. 23A, North Palm Beach, Fla. 33408

[21] Appl. No.: 941,885

[22] Filed: Sep. 8, 1992

[51] Int. Cl.⁵ .............................................. A01K 85/00
[52] U.S. Cl. .................................... 43/42.37; 43/42.24
[58] Field of Search ................. 43/42.05, 42.24, 42.37, 43/42.38, 42.22, 42.36, 42.45, 42.46, 42.48

[56] References Cited

U.S. PATENT DOCUMENTS

| | | | |
|---|---|---|---|
| 1,390,458 | 9/1921 | Moree | 43/42.05 |
| 1,913,282 | 6/1933 | Major | 43/42.05 |
| 2,572,608 | 10/1951 | Gabor | 43/42.37 |
| 3,490,165 | 1/1970 | Thomassin | 43/42.24 |
| 3,965,606 | 6/1976 | Bingler | 43/42.37 |
| 4,573,283 | 3/1986 | Pippert | 43/42.24 |
| 4,602,452 | 7/1986 | Reid | 43/42.05 |

FOREIGN PATENT DOCUMENTS 732818  4/1966  Canada .............................. 43/42.05

Primary Examiner—Kurt C. Rowan
Attorney, Agent, or Firm—Charles S. McGuire

[57] ABSTRACT

An artificial lure having a body portion of pliable material and a hook portion of rigid material. Curved portions of the hook extend through a passageway in the body portion generally parallel to the longitudinal axis thereof. Relative rotation of the hook and body portions changes the configuration of the pliable body, which conforms to the curvature of the portions of the rigid hook within the body passageway.

9 Claims, 1 Drawing Sheet

DUAL-POSITION FISH LURE

BACKGROUND OF THE INVENTION

The present invention is directed to the field of artificial fish lures, and more specifically to fish lures capable of assuming more than one configuration.

Among the plethora of artificial fish lures which have been designed over many years are those having a selectively changeable shape or body configuration. For example, U.S. Pat. No. 3,899,847 of the present inventor discloses a number of embodiments of lures having multiple parts which may be optionally assembled in different positional relationships to form lures of various configurations. Other lures have been devised to permit the user to bend or otherwise deform the configuration in various ways. The lure configuration may affect not only its appearance, but also its manner of movement through the water and other characteristics.

It is a principal object of the present invention to provide a novel and improved fishing lure which may quickly and easily be adjusted by the user between either of two distinct configurations.

A further object is to provide an artificial lure having a one-piece body of pliable material which may be selectively placed in a plurality of configurations by manipulation of a rigid shank extending through the body.

Another object is to provide a fishing lure consisting of only two parts, one pliable and one rigid, which the user may alternate between either of two configurations, each having a distinct and unique appearance and characteristics of action.

Other objects will in part be obvious and will in part appear hereinafter.

SUMMARY OF THE INVENTION

In accordance with the foregoing objects, the invention contemplates a lure having a body portion of pliable material, such as any of a number of suitable plastics, extending generally along an axis between head and tail ends. The body is formed with a through passageway running along at least a portion of its length, preferably substantially parallel to the central axis. A hook is formed with the usual pointed, terminal end on one side of a curved portion, and a rigid shank extending from the other side of the curved portion. Part of the curved portion of the hook extends into the body passageway at the tail end, and the shank extends through the remainder of the passageway, exiting at a position adjacent the head end where it is provided with an eye for attachment of a line or leader.

The configuration of the body portion, particularly as seen from the sides, is significantly altered by twisting the hook so that the curved portions of the hook and/or shank portions within the passageway are in 180° opposite relation to the body portion. Due to its pliable nature, the body portion will conform to the axial configuration of the rigid hook, including the shank portion, extending through the body portion. The passageway closely and frictionally engages the rigid shank, whereby the relative positions of the hook and body portions may be altered only by forcefully twisting the two relative to one another.

The foregoing and other features of the lure constriction of the present invention will be more readily understood and appreciated from the following detailed description, taken in connection with the accompanying drawing, wherein:

DETAILED DESCRIPTION

Figure 1:
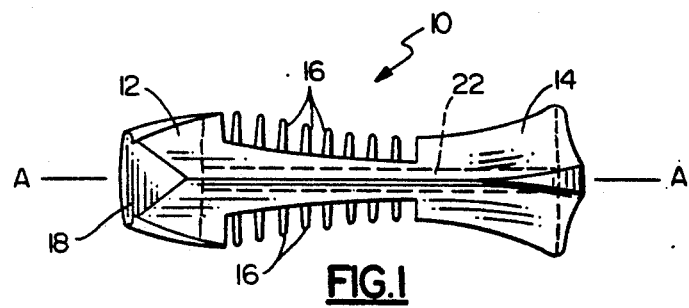
FIG. 1 is a top plan view of the body portion of the lure, prior to assembly therewith of the shanked hook.

Referring now to the drawings, in FIG. 1 is shown body portion 10, preferably formed as an integral, one-piece molding of a pliable, i.e., easily deformable or resilient, material such as rubber or a suitable plastic. Body portion 10 extends along a longitudinal axis A—A which, in plan view, is linear. Body portion 10 includes head end 12, tail end 14, and preferably a plurality of longitudinally spaced ribs 16 extending outwardly from opposite, lateral sides thereof. Both head end 12 and tail end 14 terminate in flat surfaces respectively denoted by reference numerals 18 and 20. Passageway 22 extends through body portion 1- substantially parallel to axis A—A between open ends in surface 24, adjacent head end 12, and in surface 20 at tail end 14.

A hook portion is formed of substantially rigid material, such as heavy gauge wire or other metal stock. The hook portion is also preferably an integral, one-piece element, whereby the entire lure may consist of only two parts, i.e., the body and hook portions. The latter extends between first end 26, preferably formed as an eye for attachment of the lure to a line, leader or other tackle, and a second end 28, terminating in the usual, sharp point which may be barbed, as shown. The hook includes shank portion 30 and substantially U-shaped, curved portion 32, respectively extending from a juncture with one another to first end 26 and second end 28.

Assembly of the body and hook portions involves passing first end 26 of the hook into the open end of passageway 22 in surface 20, and through the passageway until first end 26 extends out of the open end of the passageway in surface 24. The cross section of passageway 22, which is uniform throughout its length, conforms substantially to the cross section of the hook, also uniform except at pointed second end 28. If the body portion is formed as a one-piece molding, as previously suggested, insertion of the hook may be most advantageously performed soon after removal of the material from the mold, before it has fully cured. Relative dimensions of the passageway and hook are such that essentially all of shank portion 30 and a little less than half of curved portion 32 are within passageway 22.

Figure 5:
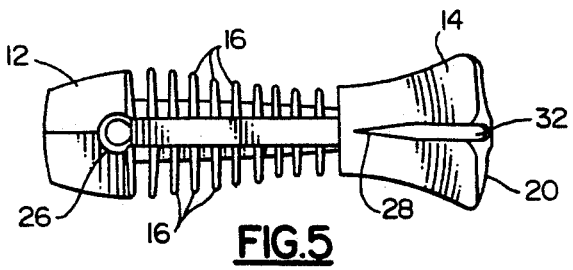
FIG. 5 is a bottom plan view of the lure in the configuration of FIGS. 2-4.

Although the material of body portion 10 forming the walls of passageway 22 tightly, frictionally engages the portions of shank 30 and curved portion 32 which are inside the passageway, the body and hook portions do not adhere to one another. Thus, by grasping and holding body portion 10 with one hand and exerting a turning force on curved portion 32 with the other hand, the relative rotational positions of the body and hook may be changed. Due to 10 the rigidity of the hook and the pliable nature of the body material, the longitudinal configuration of the lure conforms to that of the portions of the hook within passageway 22. Although shank and curved portions 30 and 32 lie on linear axis A—A in plan view (see FIG. 5), that part of curved portion 32 within passageway 22 is of course curved, and shank portion 30, particularly near its juncture with the curved portion, may also have a relatively small amount of curvature in side view.

Figures 2, 3, 4:
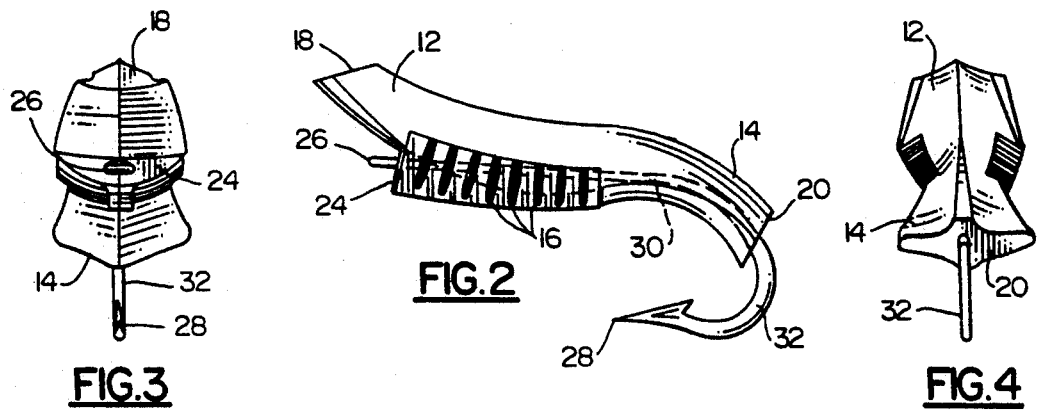
FIG. 2 is a side elevational view of the assembled body portion and shanked hook in a first positional relationship, showing a first lure configuration.
FIGS. 3 and 4 are front and rear elevational views, respectively, of the lure in the configuration of FIG. 2.
Figure 6:
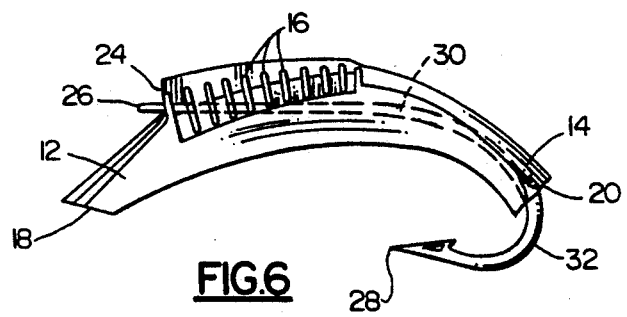
FIG. 6 is a side elevational view of the lure in a second positional relationship of the body portion and shanked hook, showing a second lure configuration.

The lure is shown in side view in FIGS. 2 and 6 with the hook in the same orientation, and with body portion 10 rotated 180° about its longitudinal axis. That is, what is shown as the top side of body portion 10 in FIG. 2 is the bottom side in FIG. 6. It is apparent from comparison of FIGS. 2 and 6, which accurately depict the longitudinal configuration of body portion 10 in each of its 180°-reversed positions relative to the hook, that the lure assumes two distinct appearances. Pointed end 28 is directed toward head end 12 of the lure in both cases, of course, since it is only the relative orientation of the body and hook portions about the longitudinal axis which are altered.

Changing the configuration of the body portion of the lure in this manner provides not only a different visual appearance, but also affects the action of the lure as it is drawn through the water by a line or leader attached to eye 26. Thus, the present invention provides an extremely versatile lure having only two parts which may be manually manipulated to provide a plurality of distinct configurations.

What is claimed is:
1. A fishing lure comprising
   a) a body portion of pliable material extending between a head end and a tail end;
   b) a passageway extending through said body portion substantially longitudinally thereof; and
   c) a hook of rigid material extending between first and second ends respectively substantially adjacent said head and tail ends of said body portion, said hook including integral curved and shank portions, said curved portion terminating in a sharp point at said second end, a portion of said hook between said first and second ends extending through and frictionally engaged by said passageway and having a predetermined curvature to which said body portion generally longitudinally conforms, said body portion and hook being mutually relatively rotatable between at least two relative positions, thereby changing the shape of said body portion between respective first and second longitudinal configurations.

2. The lure of claim wherein said hook includes an integrally formed eye at said first end.

3. The lure of claim 1 wherein said body portion includes opposite lateral sides and a plurality of longitudinally spaced ribs extending radially outwardly on each of said opposite lateral sides.

4. The lure of claim 1 wherein said body portion includes top and bottom sides and wherein said two relative positions are such that said top and bottom sides are reversed with respect to the orientation of said hook in said first and second configurations of said body portion.

5. The lure of claim 1 wherein said body portion comprises a one-piece molding of said pliable material.

6. The lure of claim 1 wherein said sharp point at said second end of said hook is directed substantially toward said head end of said body portion in both said first and second configurations thereof.

7. The lure of claim 6 wherein said curved portion is substantially U-shaped and a portion thereof extends into said passageway.

8. The lure of claim 7 wherein said shank portion lies in substantially the same plane as said curved portion.

9. The lure of claim 8 wherein said shank portion has a relatively small degree of curvature between said first end and its juncture with said curved portion.

* * * * *